US007647599B2

(12) United States Patent
Khawand

(10) Patent No.: US 7,647,599 B2
(45) Date of Patent: Jan. 12, 2010

(54) INTERPROCESSOR COMMUNICATION NETWORK PROVIDING DYNAMIC DEDICATION OF PORTS

(75) Inventor: Charbel Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 767 days.

(21) Appl. No.: 10/743,663

(22) Filed: Dec. 22, 2003

(65) Prior Publication Data
US 2006/0179145 A1 Aug. 10, 2006

(51) Int. Cl.
G06F 3/00 (2006.01)
G06F 9/44 (2006.01)
G06F 9/46 (2006.01)
G06F 13/00 (2006.01)

(52) U.S. Cl. ..................................... 719/328
(58) Field of Classification Search .................. 719/328
See application file for complete search history.

(56) References Cited

U.S. PATENT DOCUMENTS

| 6,032,259 | A | * | 2/2000 | Nemoto ......................... 726/3 |
| 6,157,959 | A | * | 12/2000 | Bonham et al. ............. 719/313 |
| 6,195,366 | B1 | * | 2/2001 | Kayashima et al. ......... 370/475 |
| 6,324,263 | B1 | * | 11/2001 | Sherwood et al. ........ 379/88.19 |
| 6,349,342 | B1 | * | 2/2002 | Menges et al. .............. 719/316 |
| 6,510,156 | B1 | * | 1/2003 | Brock et al. ............. 370/395.1 |
| 6,553,403 | B1 |  | 4/2003 | Jarriel et al. |
| 7,062,642 | B1 | * | 6/2006 | Langrind et al. ................ 713/1 |
| 2002/0007410 | A1 | * | 1/2002 | Seagren et al. .............. 709/227 |
| 2005/0025156 | A1 | * | 2/2005 | Smathers ................. 370/395.5 |

FOREIGN PATENT DOCUMENTS

| EP | 0794490 A | 9/1997 |
| EP | 1322097 A | 6/2003 |
| KR | 20010048804 | 6/2001 |

OTHER PUBLICATIONS

Intel 440EX AGPset: 82443EX PCI AGP Controller (PAC), Intel Corporation, Apr. 1998.
OMAP processors for wireless devices, Texas Instruments, 2003.
PCT International Search Report for PCT/USO4/42402. Filed Dec. 16, 2004. 8 pages.

* cited by examiner

Primary Examiner—Li B Zhen
Assistant Examiner—KimbleAnn Verdi

(57) ABSTRACT

An IPC protocol/network allows for dynamic dedication of ports in order to reduce system latencies and power consumption. The IPC system allows for either the IPC server or any of the IPC clients to request that a port(s) be dedicated for use in the transfer of data, such as real-time data. The request for a port can occur for example by a client transmitting a control message to the server/another client requesting that a particular port be dedicated for its use. The server and client(s) negotiate the port dedication and once dedicated, the client can use the dedicated port to transfer its data either to the server or to another client. In one embodiment, the server can take away a dedicated port if it determines it needs the port for another data transfer that may be more critical or have a higher priority.

11 Claims, 13 Drawing Sheets

300

| PORT NUMBER | IPC ADDRESS |
|---|---|
| 1 | 0-31 |
| 2 | 32-64 |
| 3 | 65-127 |
| 4 | • |
| ⋮ | ⋮ |

| PORT NUMBER | STATUS |
|---|---|
| 1 | DEDICATED |
| 2 | DEDICATED |
| 3 | NOT DEDICATED |
| ⋮ | ⋮ |

2300

INTERPROCESSOR COMMUNICATION NETWORK PROVIDING DYNAMIC DEDICATION OF PORTS

TECHNICAL FIELD

This invention relates in general to the field of electronics, and more specifically to an InterProcessor Communication (IPC) protocol/network providing dynamic dedication of ports.

BACKGROUND

Most electronic systems include a number of networked elements (components) such as hardware and software that form the system. In most systems there is a layer responsible for communication between the different components that form a networked element as well as between the different networked elements themselves. This layer is typically referred to as the InterProcessor Communication (IPC) layer.

Several protocols have been introduced in the last few years to deal with interprocessor communications. One example of an IPC product is PCI AGP Controller (PAC) that integrates a Host-to-PCI bridge, Dynamic Random Access Memory (DRAM) controller and data path and an Accelerated Graphics Port (AGP) interface. Another example of an IPC product is the OMAP™ platforms. Neither of these platforms provide much if any support above the hardware level and provide little design flexibility at the lower level component or channel levels (physical layer).

The above mentioned platforms do not extend to the component levels and they also do not allow for dynamic assignment of IPC resources, hardware support capabilities, or multi-node routing, etc. as well as not allowing for the dynamic assignment of the IPC resources. With the need for lower power consumption and less system latencies, a need exists in the art for an IPC network that can provide for dynamic dedication of ports so that there is less wasted time when data such as real-time data has to be transferred in an IPC system.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
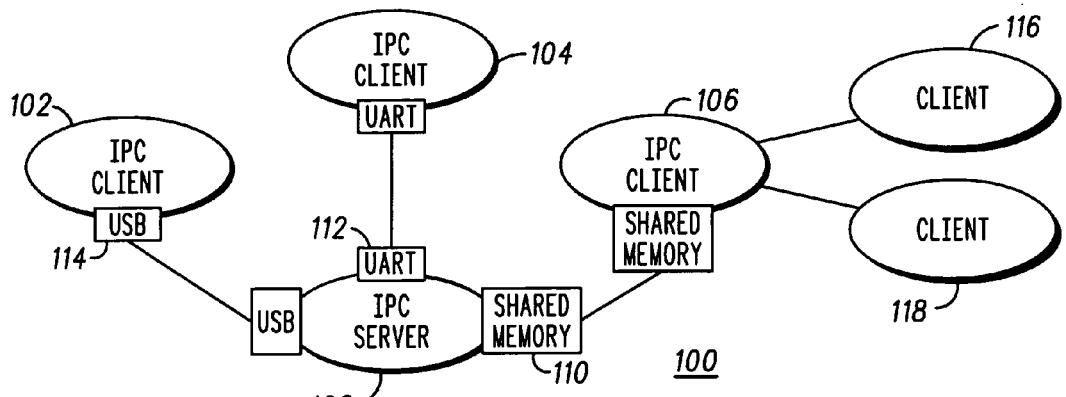
FIG. 1 shows a diagram of an IPC network in accordance with an embodiment of the invention.

While the specification concludes with claims defining the features of the invention that are regarded as novel, it is believed that the invention will be better understood from a consideration of the following description in conjunction with the drawing figures.

The IPC of the present invention provides the support needed for different processors operating in a system to communicate with each other. For example, in a dual processor (or multi-processor) radio architecture for use in a radio communication device that includes an Application Processor (AP) and a Baseband Processor (BP), the IPC provides the support needed for the processors to communicate with each other in an efficient manner. The IPC provides this support without imposing any constrains on the design of the AP or BP.

In general, dual-core architectures represent a division of labor between the AP and BP. The BP processes real-time and over-the-air data while the AP packages the data and presents it to the user. The two depend on one another for services and do so through the exchange of IPC messages. Since the type of services between them varies, the length, speed and point-to-point exchanges of data will also vary. The goal of the IPC is not to define what these services are nor impose constraints on the design of the AP and BP. Instead, the IPC must allow any AP or BP that adopts the IPC as its inter-processor communication stack to co-exist together and the IPC operates as if the AP and BP are actually running on the same core sharing common OS and memory. With the use of multiple processors in communication devices becoming the norm, the IPC of the present invention provides for reliable communications between the different processors.

The IPC hardware provides the physical connection that ties together the different processors to the IPC network. Data packets are preferably transported between the different hosts asynchronously in one embodiment of the invention. Processors that are connected to the IPC network have their physical and logical addresses statistically or dynamically assigned (e.g., IPC addresses). Also, since data packets can flow in any direction within the IPC network in one embodiment of the invention, they need to carry a destination address of the processor that they are trying to reach. Their source IPC address will be used for direct replies. Routing of packets is supported between all nodes. Packets are also preferably checked for errors using conventional Cyclic Redundancy Check (CRC) techniques.

Referring now to FIG. 1, there is shown an IPC network 100 in accordance with an embodiment of the invention. The IPC network 100 includes a plurality of IPC clients 102-106 and sub-clients (clients coupled to other clients) 116-118, and an IPC server 108 coupled to the IPC clients 102-106 using different IPC physical links such as shared memory 110, Universal Asynchronous Receiver/Transmitter (UART) 112 and Universal Serial Bus (USB) 114 as some illustrative examples. It should be noted that with the IPC of the present invention, an IPC client 102-106 can negotiate with the current IPC server 108 to switch roles. If an IPC client 102-106 negotiates to become the IPC server and is granted by the server to become the new IPC server, all of the remaining IPC clients are notified that there has been a change in the network.

Figure 2:
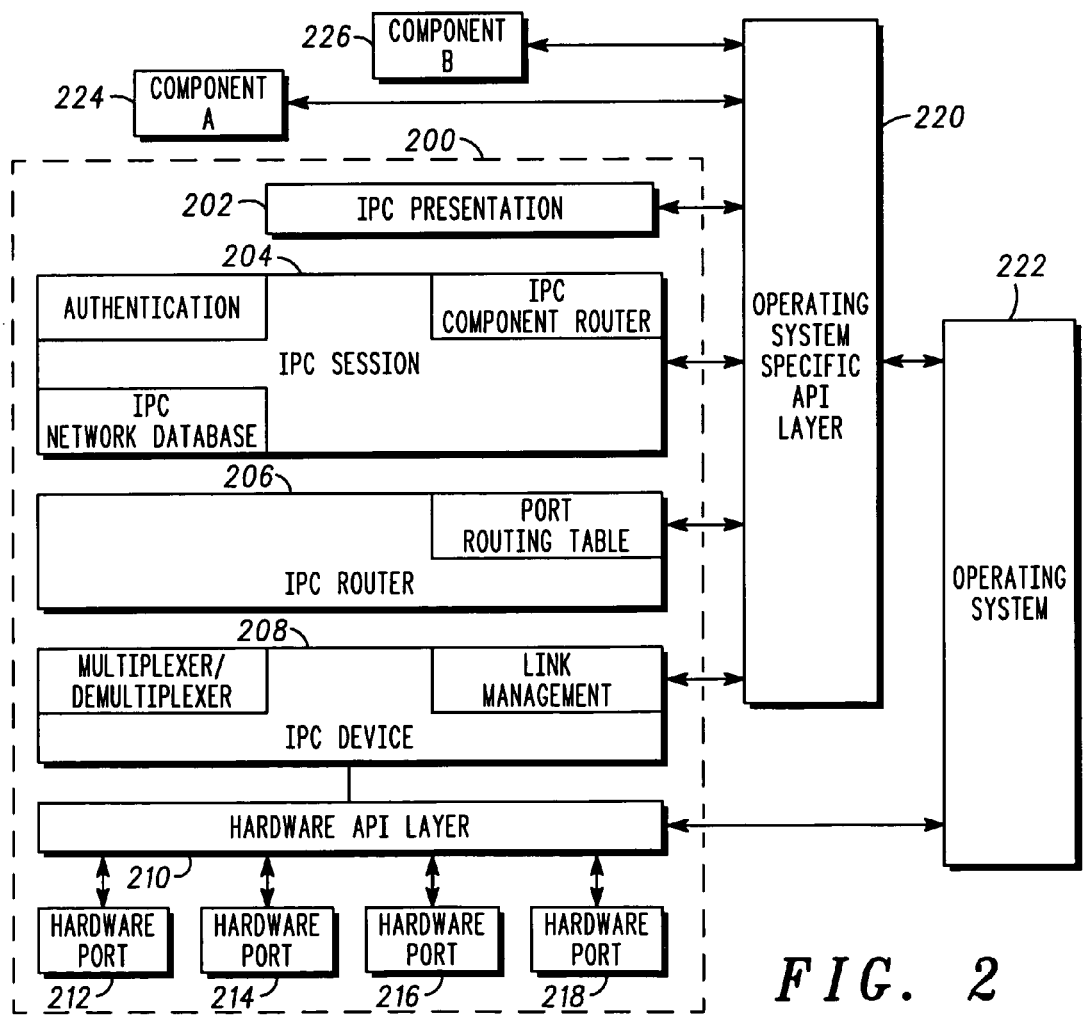
FIG. 2 shows an IPC stack in accordance with an embodiment of the invention.

In FIG. 2, there is shown an IPC stack 200 of an IPC server 108 (or IPC clients 102-106) in accordance with an embodiment the present invention. The IPC stack 200 is designed to be integrated under an Operating System (OS) 222 and to provide support for the inter-processor communication needs of components traffic. The components 224 and 226 solicit services from their IPC network through API service calls. Intricacies of the physical communication between components are handled by the IPC stack 200 and all hardware dependencies are therefore abstracted out as well. The IPC stack 200 is shown coupled to a particular OS 222 via an OS specific API layer 220.

The IPC stack 200 is composed of the following 5 main layers:

(1). IPC Presentation Manager (202)—this layer is used to translate different data types between different system components (e.g., software threads). This layer may be bypassed if enough hardware is provided to overcome issues with the data translation between different types of processor cores.

(2). IPC Session Manager (204)—this layer is a central repository for all incoming/outgoing IPC traffic between the IPC stack and all of the system components. The IPC session manager 204 has several main functions some of which are: assignment of component IDs for participating IPC components; assignment of IPC addresses; authentication/registration; authentication of components; routing to components; routing to other IPC nodes. This is the only layer that differentiates between an IPC server and a client. The session layer provides discovery of the IPC nodes.

The client session layer services are a subset of the server's session layer. Additionally the services provided by the client, the server handles the following functionalities:
1. Authentication and registration of IPC nodes.
2. Power to revoke an IPC node privileges.
3. Synchronization of DRTs.
4. Assignment of IPC address blocks.
5. Network Security.

An IPC node is assigned the role of a server during compile time. However, we should provide a way for any (trusted) IPC node to take on the job of a server through runtime negotiations as well. This should allow the flexibility to remove a server node gracefully from the network while keeping the communication alive.

(3). IPC Router Layer (206)—the IPC router layer stores all of the necessary routing information such as the network routing and port dedication tables. The IPC router layer keeps track of addresses that have been assigned as well as any ports that have been dedication within the server or a client. It is also responsible for reserving end-to-end bandwidth allocation for a given QoS across the network.

An IPC client broadcasts its configuration request initially on the IPC control channel. The IPC server receives the broadcast and responds with an IPC address for that client. This IPC address becomes associated with the dynamic routing table for that processor (AP or BP). IPC addresses are dynamically assigned only by the IPC server. There can be up to 255 IPC nodes on one particular network including the server. When a node is removed from the network, its IPC address is nullified and may be assigned to a new IPC node. The router layer must support broadcasting of packets and QoS peer-to-peer. Router should not route any packets until its node has been authenticated/registered.

(4). IPC Device Interface Layer (208)—the device layer abstracts the physical medium for all inbound and outbound traffic. The upper layers of the IPC stack rely on its services to transport control and component and component traffic across the link. There may be more than one physical IPC link connected to the device layer. Some of its main functions are: discovery of hardware ports, enumeration of ports, multiplexing and de-multiplexing of packets, assignment of logical channels to components, synchronization of the physical medium and guarantee of physical bandwidth per assigned channel.

The device layer interfaces to the hardware through a set of HAL API's. It manages the assignment of the IPC physical to logical channel mapping. This layer is in charge of managing the physical bandwidth of the IPC link underneath to support data flow across all IPC hardware ports. It provides support for multiple port connections simultaneously for daisy chaining of IPC nodes. The device layer also manages QoS for dedicated and non-dedicated IPC channels. It provides multiplexing and de-multiplexing operations for sending and receiving the IPC data. When messages are constructed, this layer forwards them to the session manager 204 for further processing.

The device interface layer is responsible for managing the IPC physical-to-logical IPC channels. Its main function is to abstract the IPC hardware completely so that the stack IPC becomes hardware independent. The device interface layer also manages the physical bandwidth of the IPC link underneath to support all of the IPC logical channels. In the incoming path, the device interface layer picks up data from different physical channels and passes them up to the rest of the IPC stack. On the outgoing path, the device interface layer manages the data loading of the IPC logical channels by sending them onto the appropriate physical channels. The device interface layer also handles concatenating IPC packets belonging to the same IPC channel before sending them to the IPC hardware. Channel requirements are pre-negotiated between the IPC session manager and the IPC device interface layer. The device interface layer provides for hardware ports which in turn provide a device interface to an IPC client.

The IPC stack uses a reserved control channel for communication purposes between all participating IPC nodes. On power-up, the IPC session manager server uses this link to broadcast messages to IPC clients and vice versa. During normal operations, this channel is used to carry control information between all APs and BPs. Control channels must be guaranteed bandwidth by the device layer independent of the IPC link beneath it.

(5). IPC hardware API layer (210)—provides the needed interface between the hardware ports (212, 214, 216, 218) at the physical layer and the rest of the IPC stack. The hardware API layer also provides any protocol translation between the hardware ports (212, 214, 216, 218) and the IPC stack and OS.

The IPC network is comprised of IPC nodes communicating together through a set of physical links. To the IPC network, a node is defined as a fully IPC stack-compliant entity capable of receiving and transmitting IPC control and data messages to/from other nodes on the network. Each IPC node can support multiple IPC links for daisy-chaining operations. The IPC server is the only node responsible for the registration/authentication and IPC address assignment of the IPC clients. There may be only one IPC server on any given network but with several IPC client nodes. Each IPC node has one unique IPC address assigned to it dynamically during a 'hot connection' to the network or during power-up.

IPC data and control packets carry unique IPC opcodes (e.g. Audio Decode opcode, AT command opcode for battery charge, etc.). These IPC opcodes specify the type of IPC Data received in the IPC packet. IPC node types identify the IPC node and are unique. IPC components such as components 224 and 226 have pre-compile knowledge of what the IPC node types mean and what each IPC opcode is used for.

IPC node type examples include iDEN™ BP, GPRS BP, etc. Similarly, a separate document also defines the IPC opcodes and their data structures. Component software need only be aware of those two unique data definitions. The intricacies of communication are left to the IPC stack. Routers are part of the stack and handle message flow operations between IPC nodes. Flow control is a function of the IPC stack itself and is implemented through the use of watermarks at the session layer.

IPC Address Assignment

IPC addresses are assigned only by the IPC server 108 and peer nodes. The node will always pick the highest IPC address from a range of addresses that are assigned to it. The node is then known by this IPC address. When a node is no longer available, its IPC privileges are revoked and therefore its IPC address is no longer valid. The IPC software will invalidate and remove the IPC node information from the network. If messages are sent to a removed IPC node, the parent router will return an error message back with illegal destination address. A node cannot have more than one IPC address. IPC addresses are unique within a given IPC network. The server IPC address is always set to 254. Address 255 is reserved for broadcasting services.

An IPC client broadcasts its configuration request initially on the IPC control channel. The IPC server receives the broadcast and responds with an IPC address for that client. This IPC address becomes associated with the dynamic routing table for that processor (AP or BP). IPC addresses are dynamically assigned only by the IPC server. When a node is removed from the network, its IPC address is nullified and may be assigned to a new IPC node.

IPC Message Routing

Any IPC node wishing to do any communication on the IPC network must register with the IPC session server first. After successful authentication, the requesting IPC node becomes eligible for communication on the IPC network. There is a router in every IPC node. Its function is to route IPC messages to the next destination node or terminate them in the event it cannot resolve the IPC address to any given hardware port destination. If the router is forwarding IPC messages to another node, it will not pass the message up to the session manager. Components that require a communication channel across multiple nodes will have to request end to end QoS across all those nodes through their respective routers. A router is also allowed to request channel QoS from the device layer underneath.

IPC Header

Figure 3:
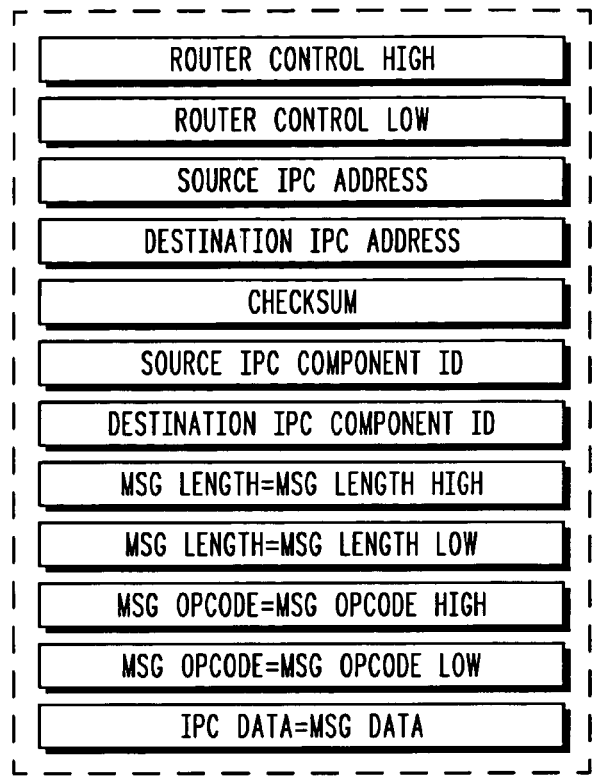
FIG. 3 shows an IPC component IPC assignment in accordance with an embodiment of the invention.

An IPC Header 300 is shown in FIG. 3. All IPC packets carry this header. The session manager fills the source and destination IPC addresses. The source Component Identification Number (CID) is the one sent during the data request and the destination CID is optional. If no target CID is inserted, the destination node will forward the IPC message to all subscribed components. In the event that the destination CID is inserted by the source component, the IPC message is routed only to that component. The final Data checksum is inserted by the session layer and can be turned on or off optionally. If the router inserts its control words to the IPC header, the checksum needs to be updated. The checksum calculation includes the IPC header and the data portion of the message. When packets are delivered on the receiver side by the device layer to the session layer, the former makes sure the checksum is verified before forwarding any of the data upward. Data checksum can be optionally omitted but the IPC header checksum must always be included. The most significant bit of the checksum indicates whether the data belonging to this IPC packet is ON or OFF. A "1" state indicates ON and a "0" state indicates OFF. There are a total of 7 bytes in the IPC header. The IPC Data field is shown only for illustration purposes and its size depends on the data structures in the IPC packet.

Any new component wishing to participate in an IPC communication must do so by first requesting an IPC Identification Number (ID) from its IPC session manager (e.g., like session manager 204). The local session manager (e.g., session manager located in client that the component is coupled to) will then alert the IPC server's session manager of the new IPC components and a CID assignment will be provided. In accordance with an embodiment of the invention, the CIDs are dynamic and can be reassigned by the session manager (e.g., the server's session manager). The IPC server will most likely be on the main AP. Each IPC node will preferably have a unique IPC node ID and the session manager will keep in its database the following information for each participating IPC node:

IPC Node Type: For example, a particular BP or AP, a Wireless Local Area Network (WLAN) AP, etc.
IPC address: The IPC address of the IPC node.
Data Type: The data type of the IPC node.
Opcode list: This is a list of all the IPC message opcodes that the components have subscribed to.
Component IDs: List of all the CIDs.

Figure 4:
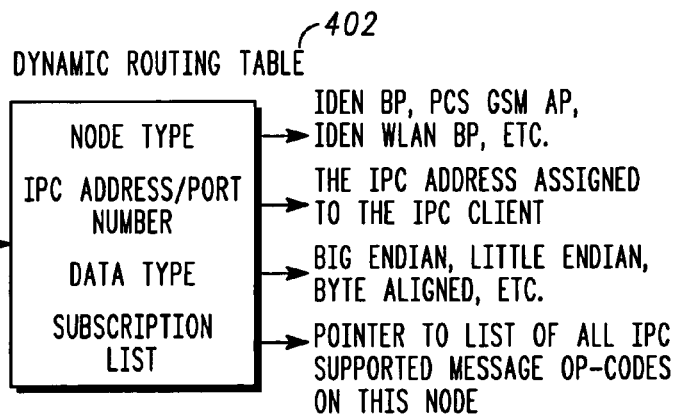
FIG. 4 shows the main IPC tables in accordance with an embodiment of the invention.
Figure 4:
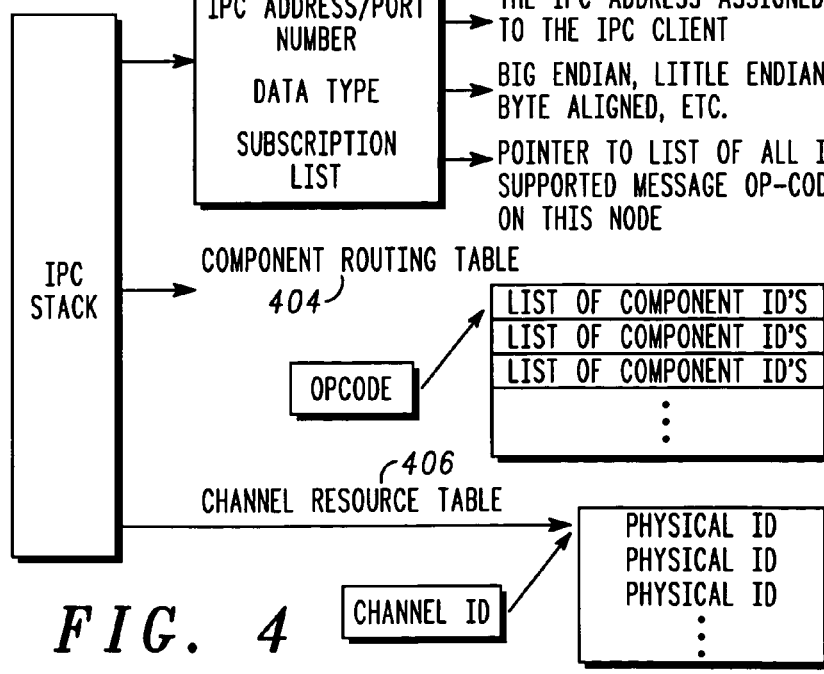

Referring now to FIG. 4, there is shown an IPC stack along with all of the main IPC tables. The Dynamic Routing Table (DRT) 402 includes the Node Type (processor type), IPC address information, Data Type and Subscription list. The Subscription list includes all IPC supported message op-codes on a particular node. The component routing table 404 includes the information linking the Opcode information and all of the components subscribed to each particular Opcode. Finally, the Channel Resource table 406 includes a linking of each Channel ID with a list of physical channel IDs.

The session layer (session manager) provides several key functions and services in the IPC stack. The IPC session layer for a client is a subset of that of a server. IPC nodes support the IPC protocol in full. Once registered and authenticated with the IPC server, they are allowed to communicate through the IPC network. The DRT is then created in the node's session layer and sent to the server. The server will then forward a copy of the DRT to the IPC nodes on the network. This will provide each active IPC node with enough information about the rest of the participating nodes.

Each manufacturer is free to choose and assign its own values for the IPC node types and IPC opcodes. The first entry in the DRT 402 identifies the type of IPC node. For example, a iDEN BaseBand (BP) may be assumed to have a hexadecimal value of 0x01. The IPC address is unique to this node as long as this node is plugged into the IPC network on a particular hardware port. This address is assigned by its peer node (node coupled at a higher level) as discussed in the router section of the document. The data type describes the type of core and data alignment rules. The IPC opcode list combines all the component subscription opcode lists that have been registered and configured on this node. A copy of this DRT will be forwarded to all active IPC nodes by the IPC server. If a change takes place in the IPC opcode list on a particular node, a new copy is sent to the server. The server then forwards the new information to all active IPC nodes.

IPC Nodes Address Discovery for Outbound Data

Each IPC node maintains an up-to-date copy of all the active DRTs on the IPC network. The session layer is responsible for alerting the IPC server if a change in its DRT has occurred. When a component forwards its packet data to the session layer for transmission, it knows nothing about the physical IPC address of the target node. Instead, the component specifies the target IPC node by its IPC node type. It is up to the session layer to discover the target IPC address corresponding to the target IPC node type. If the target node is available on the IPC network, the IPC address is fetched from its corresponding DRT. Otherwise, an error is returned to the component. The component can then use the appropriate API function to learn information about the existing IPC node on the network.

IPC Component Discovery for Inbound Data

When an IPC packet is received at the node, its target IPC address is checked by the router. If the IPC address is that of the node, the packet is forwarded to the session layer for further processing. The session is responsible for distributing the message to the registered components based on their opcode subscription lists. IPC packets can be consumed by more than one component depending on subscription lists and filter tables. As previously described, components subscribe themselves to IPC opcodes or services during their configuration process. In turn, the session layer builds the opcode subscription list (Subscription List) to aid in the IPC component routing for inbound data.

IPC Component Routing Layer

The IPC component routing layer resides in the session manager and is responsible for broadcasting and distribution of data packets to subscribed components and memory freeing of buffers upon full consumption of data. It is a requirement that received data is not altered or modified by any component. Components wishing to overwrite buffer data must make a local copy first and send the IPC component routing layer a release indication of the original buffer.

Flow control is part of the IPC component routing layer. Watermarks can be programmed per component. When data packets accumulate and are not freed, the session manager makes a decision to broadcast a flow control indication on the IPC network. When the IPC node consumes enough packets and fall below the watermark, another flow control indication is sent to resume reception of data packets. Flow control can be used to alert IPC nodes to refrain from sending information to a particular component by revealing what the components services are or simply by blocking any communication with the IPC node in question.

Figure 5:
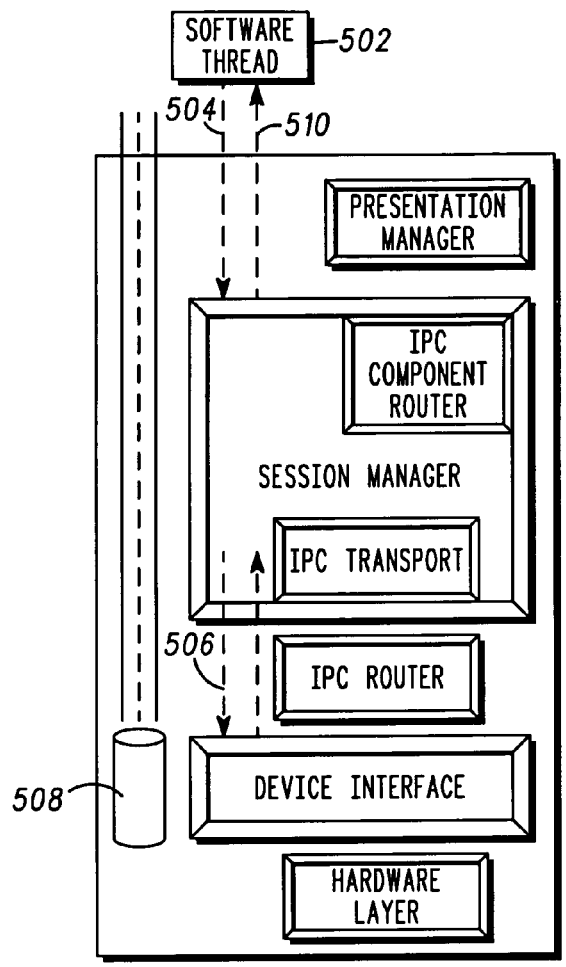
FIG. 5 shows a diagram showing channel allocation in accordance with an embodiment of the invention.

In FIG. 5, there is shown a block diagram of how the IPC stack in accordance with an embodiment of the invention, provides an IPC channel for a component such as a software thread (e.g., Audio, etc.). Component 502 first requests an IPC channel in step 504. The session manager shown in FIG. 5, negotiates the component's request with the Device Layer in step 506 using a defined API. The Device layer (Device Interface) then requests hardware resources, such as a data channel 508. The session manager shown in FIG. 5 in response to the request, grants an IPC channel to the requester in step 510. The component 502 next sends its data on the assigned channel 508. The device layer then forwards the data to the IPC network. The mapping of the logical to physical channel IDs is the function of the IPC device interface.

Figure 6:
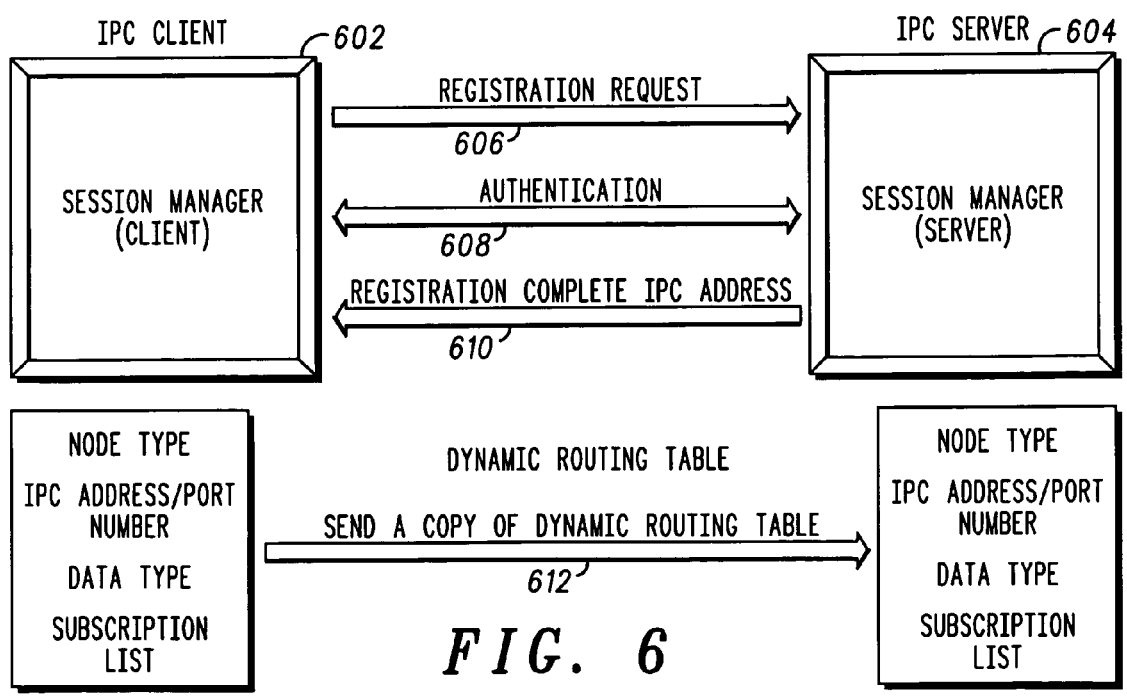
FIG. 6 shows a diagram highlighting the steps involved during an IPC client initialization routine in accordance with an embodiment of the invention.

Referring now to FIG. 6, the first step in IPC client initialization is sending an IPC address assignment request by the local node router. All clients now will wait until they receive an acknowledgment back from their peer nodes. When an address assignment is received, they will proceed to send a registration request (step 606) between the IPC client 602 and the IPC server 604. The IPC server 604 then authenticates the request with the IPC client 602 in step 608. This completes the registration in step 610. The IPC client's session manger sends a copy of its dynamic routing table to the IPC server in step 612.

Figure 7:
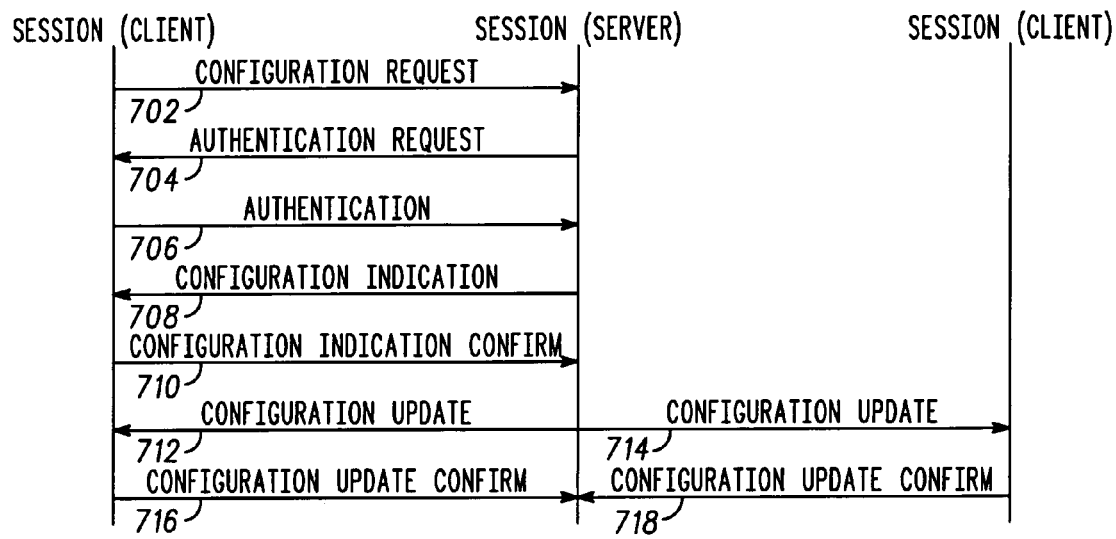
FIG. 7 shows another diagram highlighting the steps involved during an IPC client initialization in accordance with an embodiment of the invention.

More detailed steps taken during the IPC client initialization process are shown in FIG. 7. The client session manager (shown in table as Session (client)) sends a configuration request to the IPC server's session manager (shown in table as Session (Server)) in step 702. In step 704, authentication is requested by the IPC server's session manager. Authentication between the IPC client and IPC server is then carried out in step 706.

The parameters in the configuration request include the node type, the data type and the dynamic routing table of that node. The session server in response to the configuration request in step 702 assigns the requestor an IPC address. It also sets up a dynamic routing table for the requestor if one does not exist. It then sends the requestor a configuration indication as in step 708.

In response to receiving the configuration indication, components attached to the session client can request control/data from the client's session manager. The Session client then sends a configuration indication confirm message to the session server in step 710. The "configuration indication confirm" message has no parameters, upon receiving the configuration indication confirm message in step 710, the session server can initiate IPC streams to the newly configured session client. The session server then sends configuration update messages to the session clients in steps 712 and 714. This causes both session clients shown in FIG. 7 to update their respective dynamic routing tables (not shown) and send a configuration update confirm message to the session server in steps 716 and 718. Upon receiving the configuration update confirm messages, the session server makes sure all of the IPC participants have been updated.

When a packet is received by an IPC session manager from another node, it comes in the form of data that includes the source component ID, the destination ID, and the type of BP or AP. The IPC session manager will add the destination component ID in the event that the destination ID is not inserted. It is the IPC session manager that discovers the destination ID based on the message opcode received. The destination ID is based on a lookup table. This lookup table is updated dynamically each time a component subscribes to a new IPC message opcode (e.g., an audio component subscribes to audio messages by sending a request to the IPC session manager).

IPC nodes are authenticated when they send their configuration request to the IPC server. This is done either on power up or on a 'hot plug' of the IPC node to the network. The IPC node identifies itself by its node type. There shall not be duplicate IPC node types on the network. If another IPC node joins the network with a type that already exists on the network, the server must send a reject indication to that node.

Figure 8:
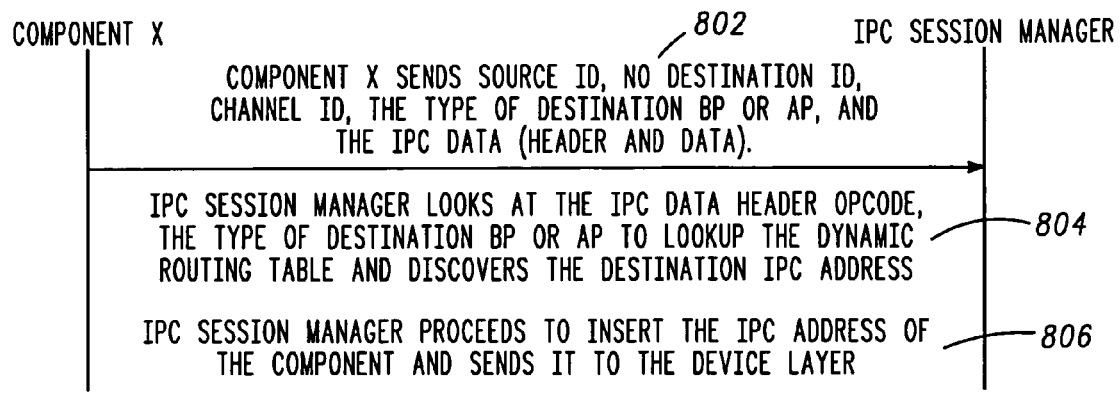
FIG. 8 shows a diagram highlighting the first level of IPC encapsulation in accordance with an embodiment of the invention.

In FIG. 8 there is shown a sequence of events during a general destination ID discovery sequence between a component and its IPC session manager in accordance with an embodiment of the invention. In step 802, the component sends its source ID (but no destination ID), the type of the destination BP or AP and the IPC data which includes a header and data. In step 804, the IPC session manager looks at the IPC data header opcode and the type of destination BP or AP, in order to lookup the corresponding dynamic routing table and find the correct destination address. In step 806, the IPC session manager inserts the IPC address of the component and sends it down to the device layer. If a message broadcast is required, the IPC address destination field is set to 0xFF.

Figure 9:
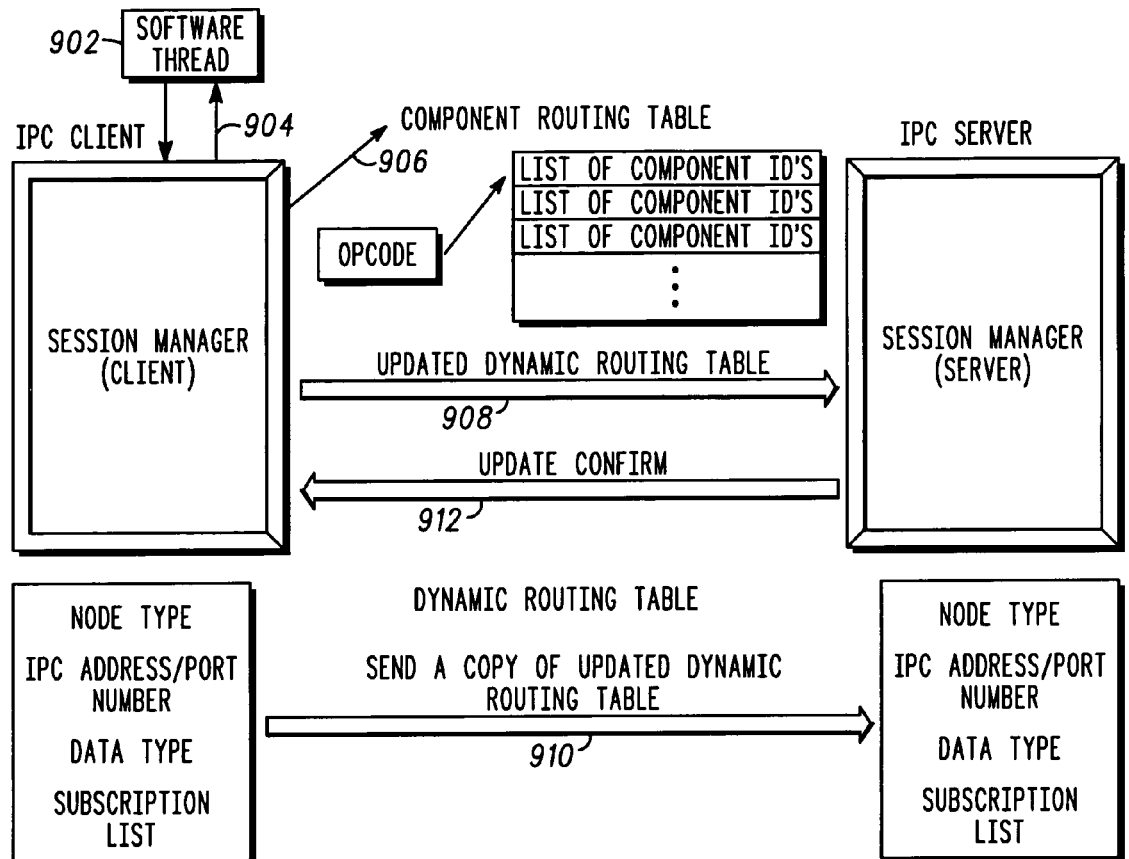
FIG. 9 shows a diagram highlighting the steps taken during IPC component initialization in accordance with an embodiment of the invention.

In FIG. 9, typical steps taken during an IPC component initialization are shown. Once the BP has been configured by the IPC server shown in FIG. 9, it allows components such as component 902 to subscribe to different services. Components will subscribe themselves to functions such as Audio, Video, etc. in step 904. The component subscription information is then sent to the IPC session manager for component ID creations (if an ID is not assigned yet) and creation or updating of the dynamic routing table for a particular IPC address (step 906). In step 908, the session manager updates the IPC server with the information from step 906. A confirmation of the dynamic routing table is sent in step 912 by the IPC server to the IPC client. Once the server is alerted, new dynamic routing table updates are broadcast to all participating processors in step 910.

Figure 10:
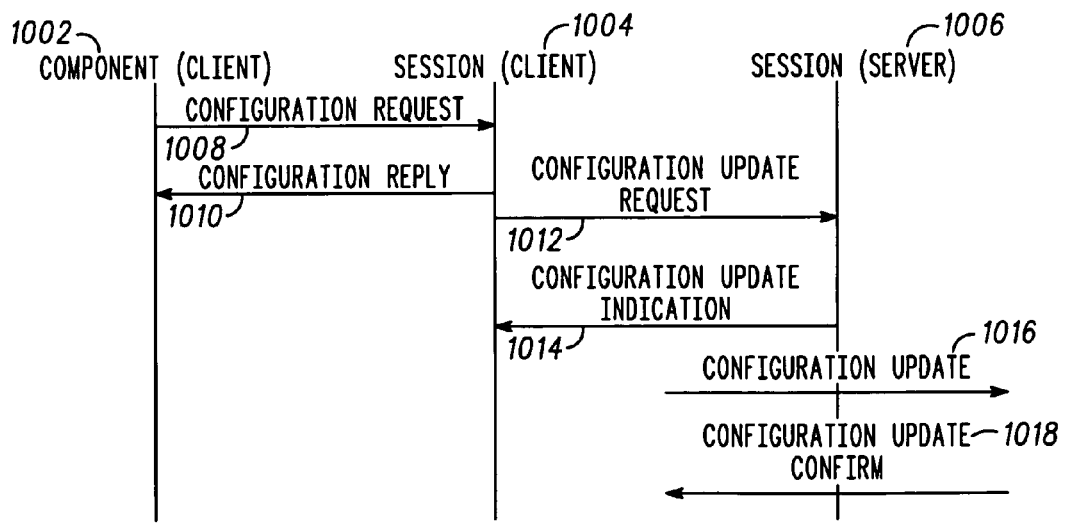
FIG. 10 shows a chart highlighting the steps taken during component initialization in accordance with an embodiment of the invention.

The same component initialization process is shown between a component (client) 1002, a session (client) also known as a client session manager 1004 and the session (server) also known as the server session manager 1006 in FIG. 10. A component configuration request in step 1008 is sent by the component (client) 1002. The client session manager 1004 also assigns a component ID and adds the new opcode list to its dynamic routing table (not shown). In step 1010, the client session manager 1004 sends a configuration reply which includes the component ID. In response to the configuration reply, the component (client) 1002 receives its ID from the client's session manager 1004.

Once the client session manager 1004 replies in step 1010 to the configuration request in step 1008, the client session manager 1004 sends a configuration update request in step 1012 to the session server 1006. The parameters for the configuration update request are any new changes that have been made in the dynamic routing table. The session manager updates the dynamic routing table for that IPC address. The server session manager 1006 in step 1016 then sends all the IPC clients a configuration update, while it sends the IPC client a configuration update indication in step 1014. The server's session manager 1006 makes sure the IPC server has updated its routing table with the changes that were sent.

In the configuration update message of step 1016 which includes the dynamic routing tables as a parameter(s), the session server 1006 updates the dynamic routing tables and sends a configuration update confirm message in step 1018. The session server 1006 then makes sure all of the IPC participants have been updated.

The IPC session manager determines the routing path of incoming and outgoing IPC packets. The route of an outgoing packet is determined by the component's IPC address. If the destination address is found to be that of a local processor, a mapping of the IPC to the Operating System (OS) is carried out within the session manager. If the destination address is found to be for a local IPC client, the packet is sent to the IPC stack for further processing (e.g., encapsulation). Note that if the destination component is located on the same processor as the component sending the IPC packet, no encapsulation is required and the packet gets passed over through the normal OS message calling (e.g., Microsoft Message Queue, etc.). In this way components do not have to worry about modifying their message input schemes. They only need to change their message posting methodologies from an OS specific design to an IPC call instead which is abstracted out in the OS layer specified in this embodiment.

For incoming packets, if the destination address of the message is not equal to the IPC server's, the incoming packets gets routed to the proper IPC client by the router. The routing of incoming packets is handled by the router manager of the IPC node. Otherwise, the message is forwarded to the right component or components depending on whether or not the component destination ID is set to a valid component ID or to 0xFF.

The IPC router block transports the IPC data to the destination component. Incoming IPC messages carry among other things, the originator component ID and the IPC message opcodes such as those for Audio, Modem, etc. The IPC session manager relies on its component routing table to send the IPC data to the right component(s). Both the dynamic routing table and the component routing table are updated by the IPC server/client.

During power-up, each component must register itself with its session manager to obtain an IPC component ID. In addition, it must also subscribe to incoming IPC messages such as Audio, Modem, etc. This information is stored in the component routing table and dynamic routing table for use by the IPC session manager.

Figure 11:
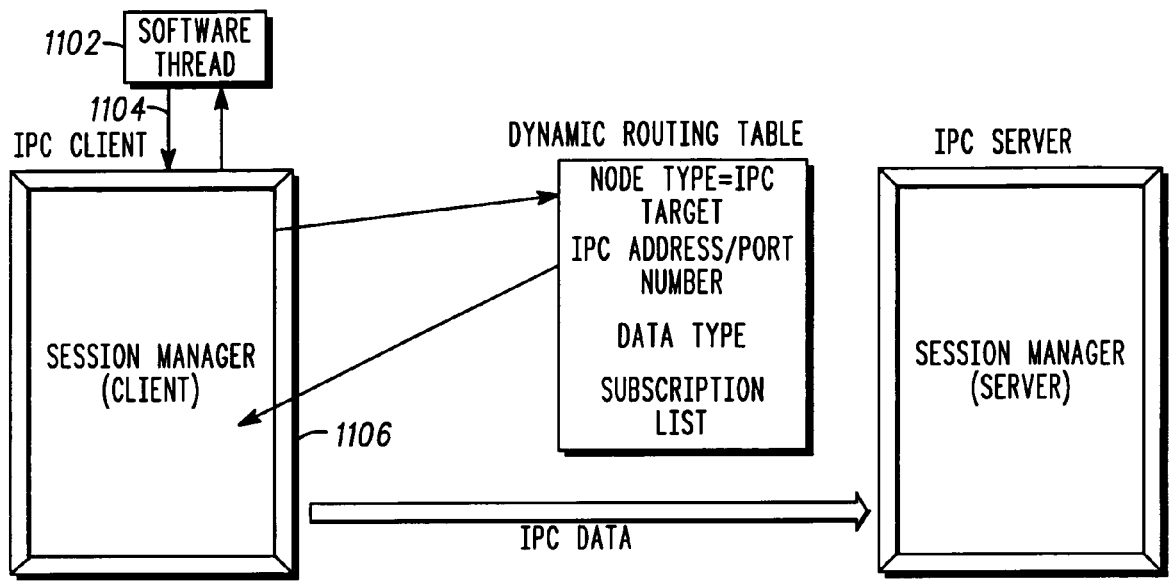
FIG. 11 shows the transfer of IPC data between an IPC client and an IPC server in accordance with an embodiment of the invention.

When a component 1102, as shown in FIG. 11, sends its data request to the IPC session manager as in step 1104, a check is made on the destination IPC node (e.g., the BP). If the IPC node does not support the IPC message opcode, an error reply is returned to the component 1102. In addition to the error reply, the IPC session manager returns an update of all the IPC nodes that are capable of receiving that particular opcode. It is up to the component to decide to which of the IPC node(s) it will redirect the message. The IPC session manager 1106 will proceed to encapsulate the data with the IPC header information before the data is sent on the IPC network if the session manager determines that the destination component is located in the IPC network but not in the local processor.

IPC Components are threads or tasks that communicate together using the IPC protocol stack. Although components residing on the same core have the option to bypass the IPC APIs for communication with other local components, it is not desirable. The intent is to keep the component's software independent of the physical location of the component and the underlying OS. There is no distinction between server and client's component interface with the IPC stack.

Component's Communication through the IPC Stack

Components use standard API calls for inter/intra communication messaging. These API calls do not change from one OS platform to the next. This allows the component software that deals with the transport of data messages to remain the same regardless of where the component is running. In addition, components can discover through a service call to the IPC session manager whether some of the services they are requesting exist locally or require an IPC link. In the event the destination component resides locally, the IPC session manager forwards the message to the right component without forwarding the data over to the device layer for transmission.

IPC Component ID Assignment

Any component wishing to participate in any IPC communication must do so by first configuring themselves with the IPC stack. The session manager of the node authenticates components and assigns them CIDs. Components cannot have more than one CID. In the event components are uninstalled from the IPC node, their CID must be removed and the IPC network must be alerted. It is the responsibility of the uninstaller or equivalent software to send the appropriate remove command to the IPC session manager. In a general use case, components need not know their target component CID to send it an IPC message. It is the responsibility of the IPC software to manage the routing abstraction from the components. Components in some cases such as replying to a received IPC message, may redirect a response by targeting the source CID. In this case the target node will forward the message to that specific component and not to all subscribed components. Components CIDs are unique within the node and not between nodes.

Logical IPC Channel Allocation

Components use logical channels to communicate on the IPC network. Logical channels are assigned by the device layer based on the QoS requested by each component. Components may have multiple logical channels assigned. In accordance with an embodiment of the invention, there are two types of channels dedicated and non-dedicated. Components choose the type of channel. Dedicated channels guarantee that QoS for the component is available each time the component uses the channel. Since there can be more than one channel with different QoS that can be given to components, IPC bandwidth may be exhausted.

To allow for components to continue sharing the communication resources, the device layer provides non-dedicated channels as an option. The QoS of non-dedicated channels is guaranteed if the bandwidth is available, otherwise the QoS is dropped depending on the total load. QoS across multiple nodes can be granted to dedicated or non-dedicated channels.

Dedicated and Non-Dedicated Channels

Dedicated channels guarantee the QoS requested by the component. As long as the channel is not released, the QoS on it will be honored. Non-dedicated channels cannot guarantee a QoS but make continuous attempts to send the data when extra bandwidth becomes available. Non-dedicated channels do not have a predictable real-time performance but can be used for asynchronous, low-bandwidth data. Components can reserve different QoS simultaneously by requesting more than one channel. Components keep their channels until they decide to release them. However, the stack is provisioned to remove a component's privilege on a dedicated channel by others with higher priorities. In this case, components holding a channel will be alerted and will be asked to release the channel or have their channel transferred over to non-dedicated modes.

QoS Assignment and Component Priority

Components request logical channels based on a QoS. The definition of a QoS is a data rate. QoS is specified by the component and negotiated with the device layer. In addition, components are assigned priorities during the registration and authentication process. This priority is used by the IPC session manager to verify component privileges in revoking and requesting channels and services from less privileged components.

IPC Component Subscription List

Part of the component registration with the IPC stack is the configuration request. When a component is authenticated, it receives a CID from the session manager. At this point, the component may configure itself with the IPC stack by subscribing to different IPC opcodes. The component chooses which opcodes it is interested in and registers those opcodes with the session layer. Component may decide to unsubscribe or change their opcode lists by sending another configuration request to the session manager.

Figure 12:
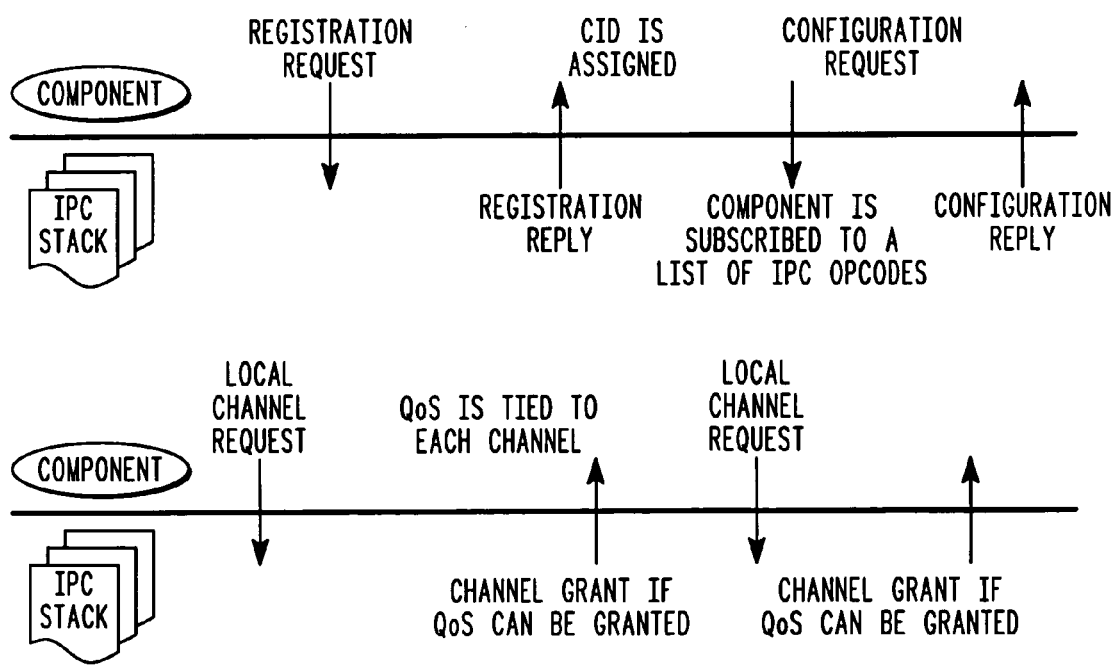
FIG. 12 shows a diagram of an IPC data header in accordance with an embodiment of the invention.

In FIG. 12 there is shown typical component communications with the IPC stack. Shown is a typical registration request, configuration request and logical channel request between a component and the IPC stack.

Figure 13:
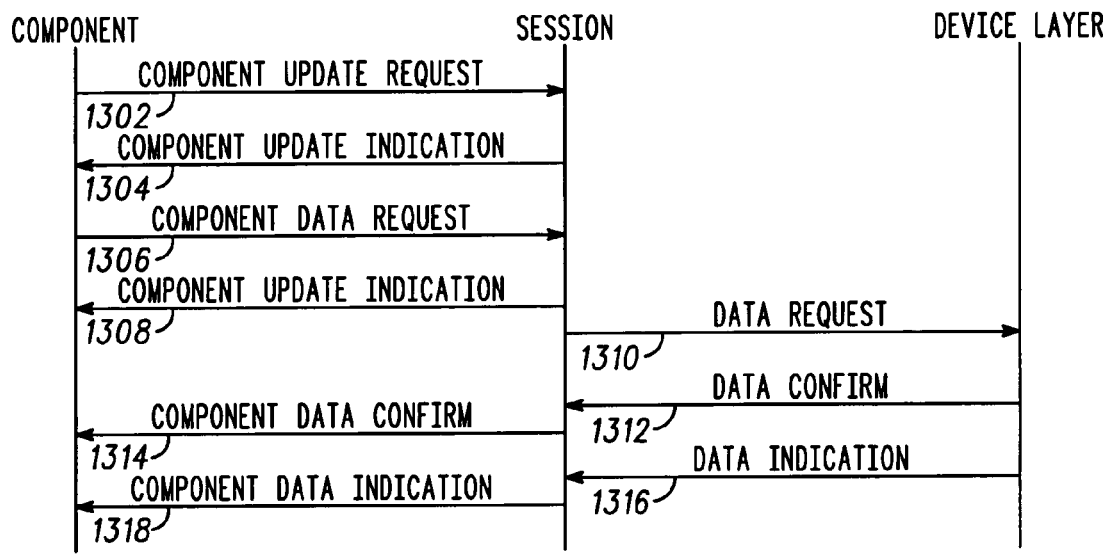
FIG. 13 shows a diagram of the steps taken during an IPC data request in accordance with an embodiment of the invention.

A typical IPC data request in accordance with an embodiment of the invention is shown in FIG. 13. In step 1302, the component sends an update request. The component update parameters preferably include the node type and opcode. The component searches for Node types that support its destination opcode. If the Node type is equal to 0xFF, the session manager proceeds to send the component information to all the node tables for all IPC participants. If the opcode field is equal to 0xFF, the session manager proceeds to send the component the opcode list belonging to the specified Node type. On the other hand, if the opcode has a specific value, the session manager proceeds to send the component a true or false value corresponding to whether the Node type supports or does not support that particular opcode.

In step 1304, the component update indication is sent to the component. If the node type is equal to 0xFF, the node tables are returned to the component. If the opcode field is equal to 0xFF, the list of opcodes is returned to the component. However, if the opcode is a specific value, a true or false message is returned. In step 1306, a component data request is made. The parameters for the component data request include the node type, the IPC message opcode, the IPC message data, the channel ID and the component ID. In a component data request, the session manager checks the node type to determine whether the opcode is supported. If the node type does not support the opcode, a component update indication is sent in step 1308. If however, the node type supports the opcode, a data request is sent to the device layer in step 1310. The data request parameters include the IPC message, the channel ID and the IPC header.

The device layer schedules to send the data request message based on the channel ID. The device layer selects the IPC hardware based on the port # header information. Once the data is committed, a data confirm message is sent to the session manager in 1312. In step 1314, the session manager proceeds to send a component data confirm message to the component. The component can wait for the confirmation before sending more IPC messages. Once a data confirm is received, the component can proceed to send the next IPC message.

In step 1316, the device layer sends a data indication message including IPC message data and an IPC header. The router manager checks the destination IPC header of the message, and if different from the local IPC address, manager sends (routes) the message to the right IPC node. In step 1310, the session manager sends a data request to the router layer with a reserved channel ID. The session manager checks the destination component ID, and if it is equal to 0xFF, routes the message to all the components subscribed to that opcode. In step 1318, the session manager sends a component data indication message and the component receives the IPC data.

The IPC stack uses a reserved control channel for communication purposes between all participating IPC nodes. On power-up, the IPC server's session manager uses this link to broadcast messages to IPC clients and vice versa. During normal operations, this control channel is used to carry control information between all APs and BPs.

Figure 14:
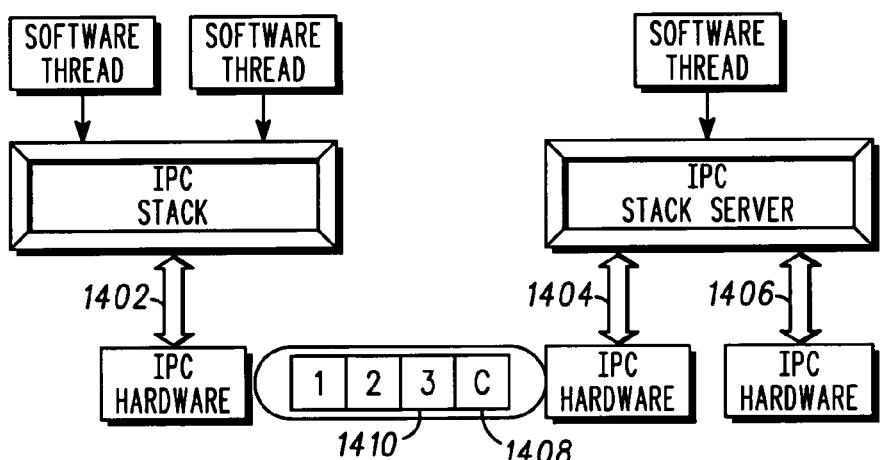
FIG. 14 shows an IPC network in accordance with an embodiment of the invention.

In FIG. 14, there is shown the control channels 1402-1406 located between the IPC stacks and the IPC hardware. Control channel information 1408 is also transmitted along with data packets 1410 when sending data between different IPC hardware. An IPC client broadcasts its configuration request initially on the IPC control channel. The IPC server receives the broadcast and responds with an IPC address for that client. This IPC address becomes associated with the dynamic routing table for that particular processor (AP or BP).

IPC Application Program Interfaces (APIs)

Below are listed some of the High Level APIs for the IPC protocol of the present invention. Each will have a defined set of APIs calls.

1). Component/Session High Level APIs:
 Component Registration and Authentication
  This is the registration and authentication process between components and their local session manager.
 Component Configuration and Management
  This is the process of component configuration with their local session manager.
 Component Channel Management
  This is the process of acquiring a logical channel for sending data to other IPC nodes.
 Component Data Management
  Inbound and outbound IPC data as well as flow control are handled here.
 Component Routing Services
  Intricacies of component routing of IPC packets are handled here.
2). Device/router interface High Level APIs
 IPC Packets Routing
  Routing of IPC packets are handled here.
 Channel Bandwidth Management
  A logical/physical channel management is handled here.
 Hardware Discovery of Hardware Ports
  Hardware discovery of IPC links is handled here.

IPC Physical Channel Management
 Address Assignment is handled here.

Figure 15:
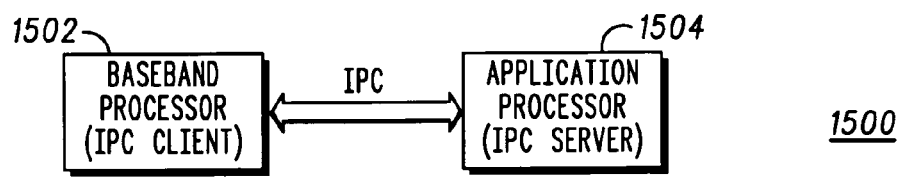
FIG. 15 shows an electronic device such as a radio communication device in accordance with an embodiment of the invention.

In FIG. 15, there is shown a block diagram of an electronic device such as a radio communication device (e.g., cellular telephone, etc.) 1500 having a baseband processor (BP) 1502 and an application processor (AP) 1504 communicating with each other using an IPC network. The IPC protocol of the present invention provides for communications between multiple processors in a system such as a communication device. The IPC allows for a Mobile Application (MA) client (e.g., iDEN™ WLAN) to register with a MA server such as a Personal Communication System (PCS) application, and will provide the means for the two MAs to communicate freely without any limitations on what software architectures, operating systems, hardware, etc. each depend on within its own MA.

The IPC protocol allows for the dynamic addition of any IPC conforming MA into the IPC link for communication. Thus, an IPC network is formed without any compile time dependencies, or any other software assumptions. The IPC of the present invention presents a standard way for software components to communicate with the IPC stack and the hardware below the stack is also abstracted such that components can choose different links to communicate.

Figure 16:
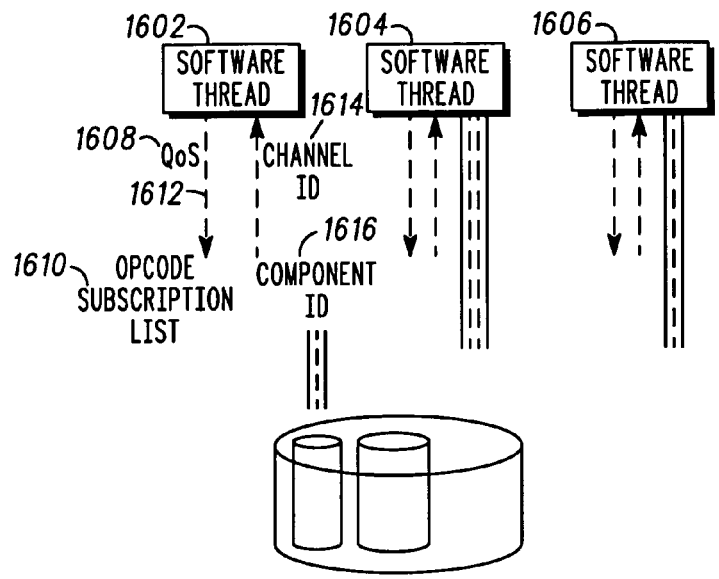
FIGS. 16 and 17 show diagrams of outbound streaming in accordance with an embodiment of the invention.

Referring now to FIG. 16, there is shown three components such as software threads, 1602, 1604 and 1606, and how they establish outbound streaming. Software thread 1602 for example, sends a request 1612 in for a predetermined QoS 1608 and submits its opcode subscription list 1610. In return, software thread 1602 is assigned a channel ID 1614 and a component ID 1616 in response message 1618. Components such as software threads 1602, 1604 and 1606 in accordance with an embodiment of the invention are assigned IPC hardware resources depending on their requirements. The components 1602, 1604 and 1606 can be dynamically installed or uninstalled depending on the system requirements.

Figure 17:
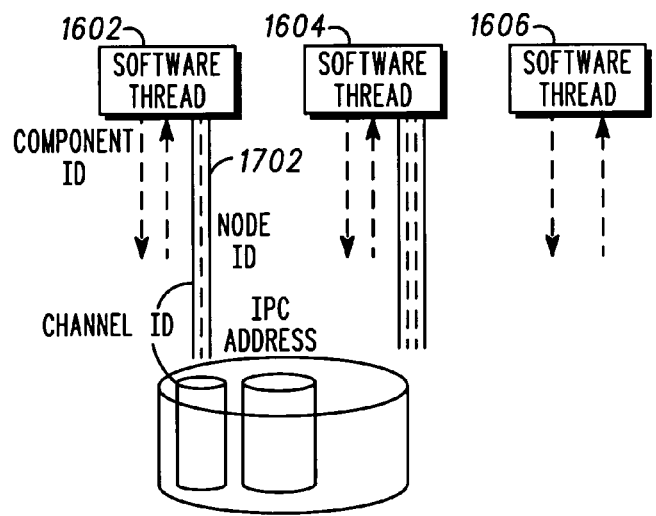
Figure 18:
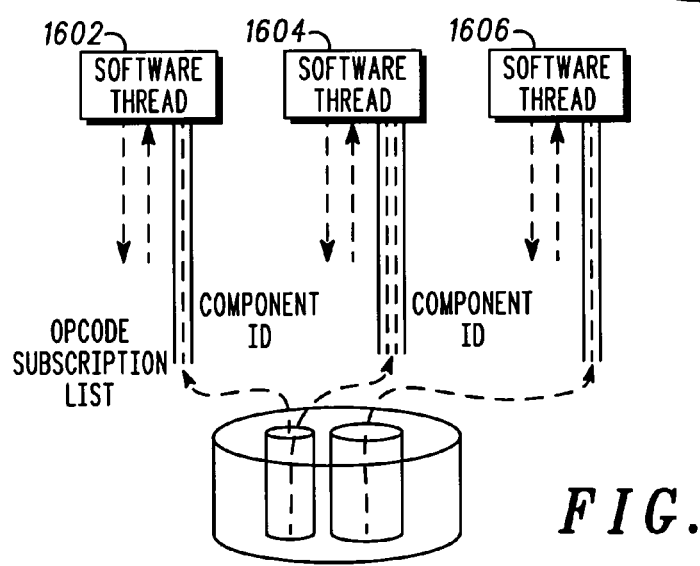
FIG. 18 shows a diagram of inbound streaming in accordance with an embodiment of the invention.

In FIG. 17, components 1602, 1604 and 1606 send IPC data on their assigned channels such as channel 1702 for software thread 1602. The components 1602, 1604 and 1606 submit their data along with a target IPC node, although components can also broadcast their messages to all IPC nodes when no node is specified. The components 1602, 1604 and 1606 do not need to know the destination components IDs, nor their associated channels nor their IPC address. Regarding inbound streaming, message opcodes identify components. For example, in FIG. 18, components 1602, 1604 and 1606 are identified by the message opcodes. Component IDs are discovered through the component routing table previously discussed. The IPC session manager routs incoming data to all the components that have subscribed to the IPC opcode in the message.

Dynamic Dedication of IPC Ports

In order to provide improved overhead efficiency and reduce system latencies, an IPC protocol/network in accordance with the invention provides for dynamic dedication of ports within the IPC network. For example, when a client processor needs to transmit large amounts of data such as voice samples or other real time data, in accordance with the invention, the client and server can negotiate the dedication of one or more of the server's/client's ports.

Figures 19, 22, 23:
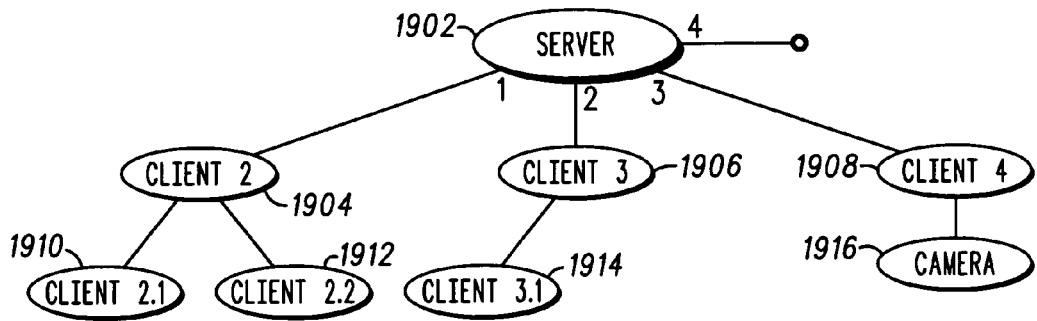
FIG. 19 shows a diagram of an IPC system in accordance with an embodiment of the invention.
FIG. 22 shows a network routing table in accordance with an embodiment of the invention.
FIG. 23 shows a port dedication table in accordance with an embodiment of the invention.
Figure 20:
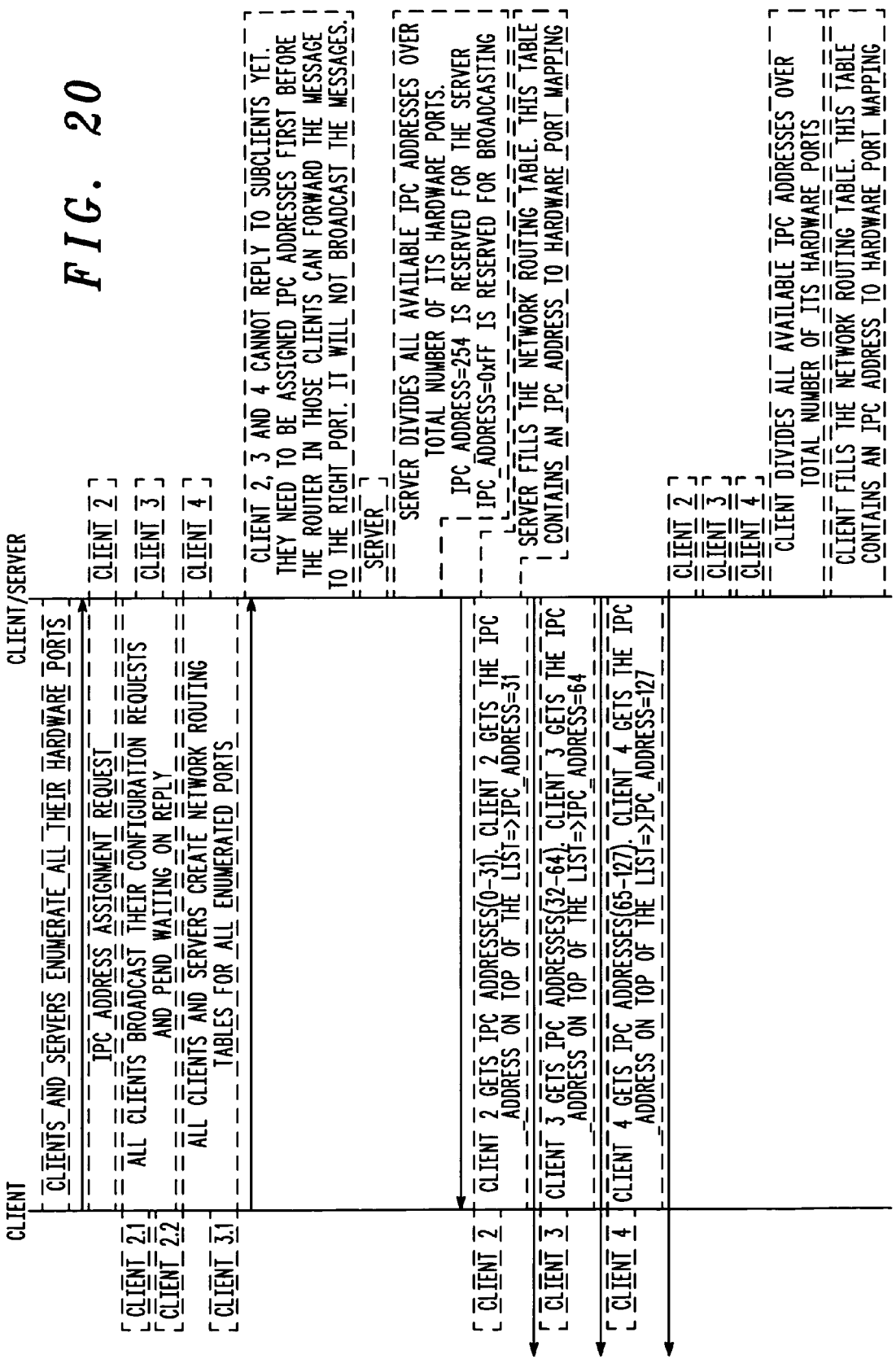
FIG. 20 shows a hardware port enumeration flow chart for the system shown in FIG. 19 in accordance with an embodiment of the invention.

In FIG. 19, there is shown an IPC network comprising a server 1902 and first (client 2) 1904, second (client 3) 1906 and third (client 4) 1908 clients coupled to the server 1902. The first client 1904 has two sub-clients, client (2.1) 1910 and client (2.2) 1912 coupled to it, while the second client 1906 has one sub client, client (3.1) 1914 coupled to it. The third client (client 4) 1908 has a camera 1916 coupled to it. When discussing the network shown in FIG. 19, nodes that are directly coupled to each other are referred to as peer IPC nodes, for example clients 2-4 (1904-1908) are peer nodes to the server 1902, while clients 2.1 and 2.2 (1910-1912) are peer IPC nodes to client 2 (1904). A IPC peer node can be at a higher level or at a lower level than a certain node, for example server 1902 is a peer IPC node to client 2 (1904), while lower level sub-clients 2.1 and 2.2 (1910-1912) are also peer IPC nodes to client 2 (1904).

Each of the clients 1904-1914 are assigned a range of addresses and each of the clients gets the IPC address on top of the range as its own port address as shown in the flowchart. The server 1902 will divide all available IPC addresses over the total number of hardware ports it has, but it reserves address "254" for itself and address "0xFF" is reserved for broadcasting messages over the IPC network.

Figure 21:
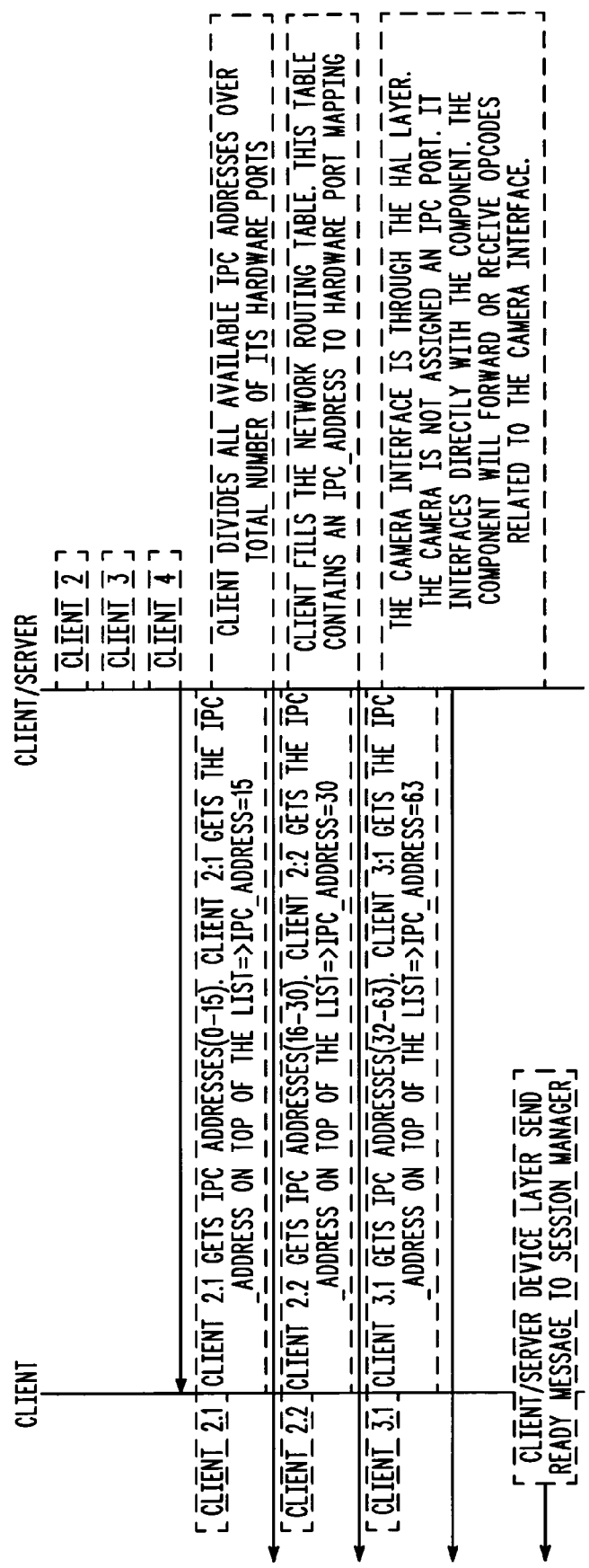
FIG. 21 shows a continuation of the hardware port enumeration flow chart of FIG. 20.

In this illustrative example, it is assumed that the server has eight ports so 256 (total number of addresses in this example) is divided by 8 yielding 32 addresses per port. So addresses 0-31 are assigned to the first client 1904, addresses 32-64 are assigned to the second client 1906, etc. Each of the clients 1904 and 1906 having sub-clients 1910-1914 further subdivide their assigned IPC addresses to their respective sub-clients as further shown in the continuation port enumeration flowchart shown in FIG. 21.

Each of the clients 1904-1914 each fills its own network routing table which contains IPC address to hardware port mapping information. Camera 1916 shown in FIG. 19 interfaces through the Hardware API Layer (HAL) so the camera 1916 is not assigned an IPC port. It interfaces directly with the component. The component will forward or receive opcodes related to the camera interface.

In FIG. 22 there is shown a network routing table for server 1902. In this particular illustrative example, the server's port 1 which is coupled to the first client 1904 (which has an address of 31) is linked with addresses 0-31, its second port which is linked to the second client 1906 (address 64) is linked with addresses 32-64, etc. Each of the clients and sub-clients 1904-1914 will also have a similar network routing table which links its ports to the IPC addresses.

In accordance with the invention if sub-client (2.1) 1910 requires a dedicated path to transmit information such as voice samples to the second client (client 3) 1906 which can decode the voice samples, it will send a message up through the IPC network to the first client (client 2) 1904. The message will include the node type and QoS required. Client 1904 if it can support the QoS will dedicate the port coupled to sub-client 1910. Client 1904 will forward a message to the server 1902 with the same node type and QoS requirements. The server 1902 if it determines that it can support the request will dedicate both of its ports 1 and 2. The server 1902 will then send a message to client 1906 that includes the node type and QoS information. Again, if client 1906 can support the request, it will dedicate its port to the request. At this point, sub-client 1910 has a dedicated path all the way to client 1906. The router layer in each of the IPC nodes where the links must be established handle the reservation of channels based on the QoS required to the next node in the link. They must request and reserve the appropriate channel by requesting a channel from the device layer.

Referring now to FIG. 23, there is shown a port dedication table 2300 for the server 1902. The port dedication table 2300 would be stored in the IPC stack router layer and would link each of the server's ports to a dedicated or non-dedicated status. If a particular port(s) is dedicated, the server 1902 will not assign these ports to other tasks, unless it wants to override the dedication (e.g., a higher priority request has come in that will require one or more of the dedicated ports). Each of the clients 1904-1908 and sub-clients 1910-1914 will have a port dedication table which will link its ports and the current dedication status for each of its ports.

The reservation process can be implemented with different options per desired mode of operation. For illustration, if the path from node client 2.1 to 2 can be dedicated with the required QoS, the router dedicates the port in the table. The next hop request goes to the next IPC node in the link. In this case, node 2.1 tries to dedicate the next link in the path towards client 3. In the event that client 2 and client 1 cannot dedicate the link at the moment, a timer can be started to wait for a present amount of time. At the expiration of the timer, a message is sent to the original requestor and the already established link may be optionally dropped or the timer between client 2 and client 3 is extended for another time. If the link is successfully established, an ok status message is sent back and the original requesting component(s) is alerted.

With each of the router layers for sub-client 1910, client 1904, server 1902 and client 1906 dedicated, sub-client (client 2.1) 1910 has a dedicated path to client (client 3) 1906. This allows for ease of data transfer and reduced overhead since header information does not need to be included when transferring packets once the path is dedicated.

Figure 24:
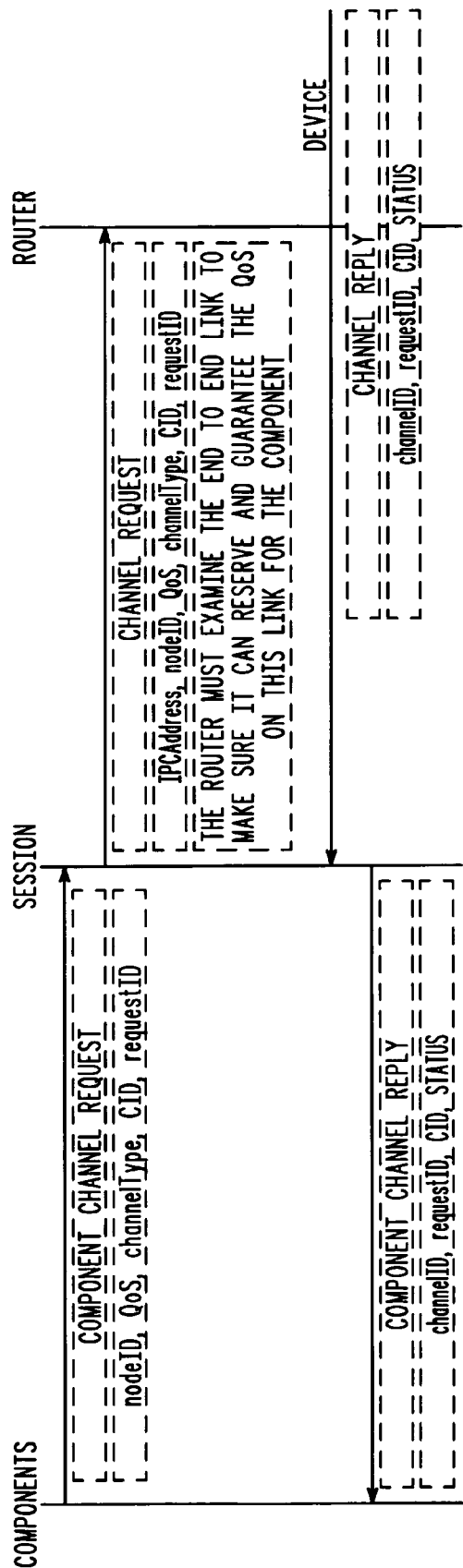
FIG. 24 shows a component channel request sequence in accordance with an embodiment of the invention.
Figure 25:
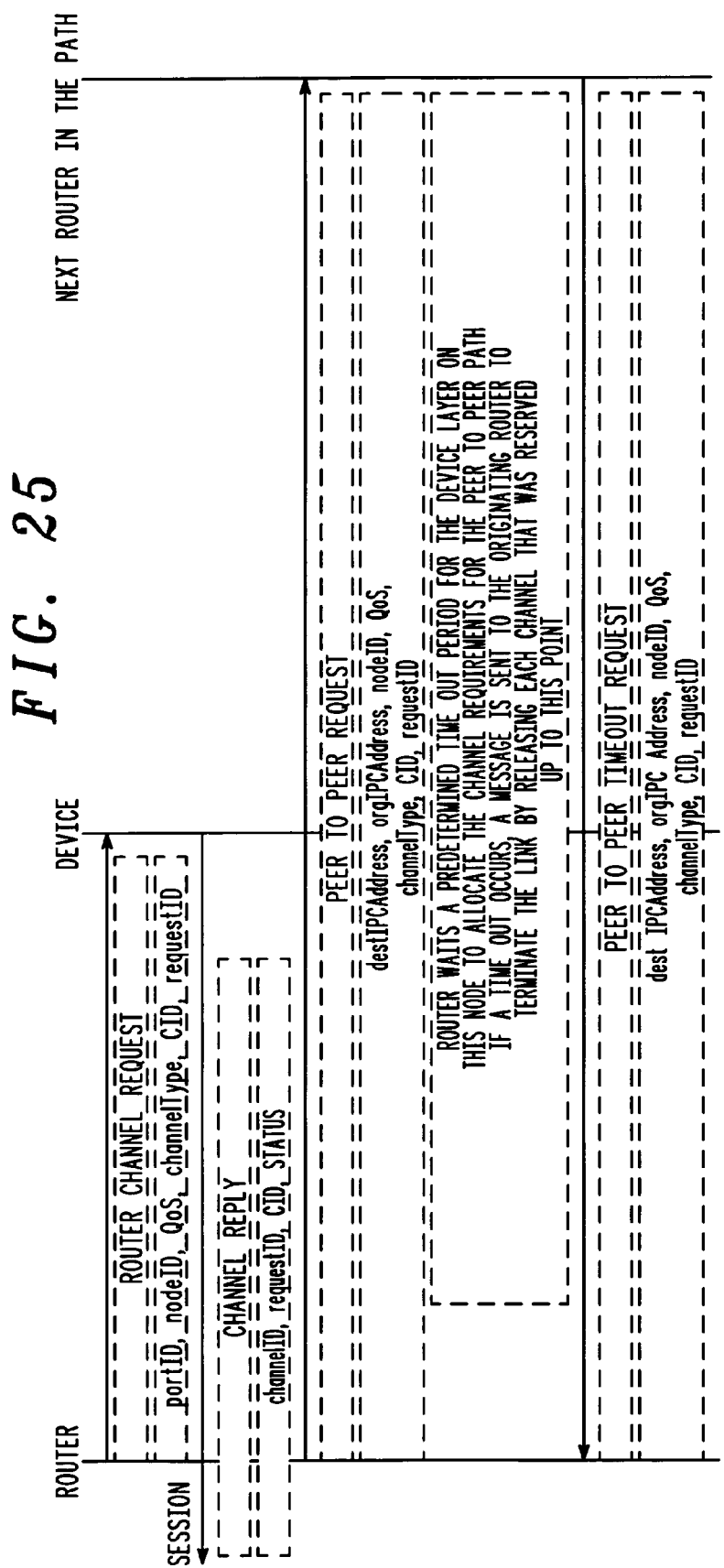
FIG. 25 shows a peer to peer router channel request sequence in accordance with an embodiment of the invention.

In FIG. 24 there is shown a component channel request sequence which includes the component channel request, as well as the session layer to router layer channel request, the device to session layer channel reply and the component channel reply. All of the transmitted variables (e.g., nodeID, QoS, etc.) are shown. In FIG. 25 there is shown the router layer channel request including the channel reply, and the peer to peer request which includes communications with the next router layer in the end-to-end path that needs to be dedicated. Also shown is a peer to peer timeout request which can terminate a link including all previously reserved channels if one of the device layers along the path fails to allocate a channel in a predetermined period of time. The router layer channel request is repeated for each link (each IPC client/server in the path) in the communication path that is to be dedicated.

While the preferred embodiments of the invention have been illustrated and described, it will be clear that the invention is not so limited. Numerous modifications, changes, variations, substitutions and equivalents will occur to those skilled in the art without departing from the present invention as defined by the appended claims.

What is claimed is:

1. An Interprocessor Communication (IPC) network, comprising:
    an IPC server;
    one or more IPC clients coupled to the IPC server; and
    the IPC server includes a port dedication table;
    wherein the IPC server includes one or more ports and the port dedication table keeps track of which of the one or more ports have been dedicated to create a dedicated path and each of the one or more IPC clients has a port dedication table;
    wherein header information does not need to be included when transferring packets over the dedicated path;
    wherein the one or more IPC clients each includes a network routing table that shows what addresses have been assigned to each of the IPC server's ports;
    wherein the IPC server or one of the one or more IPC clients upon receiving a port dedication message from one of the one or more IPC clients that is a peer IPC node informs an IPC client sending the port dedication message if it has a port available for dedication;

wherein the IPC server or one of the one or more IPC clients that is a peer IPC node informs the IPC client sending the port dedication message information about the port(s) it has available:

wherein each of the port dedication tables found in each of the one or more IPC clients includes information about the IPC client's own port(s).

2. An IPC network as defined in claim 1, wherein in the IPC network is found in a radio communication device.

3. A method for dedicating a port in an IPC network having an IPC server and an IPC client each having a port dedication table, comprising the steps of:

(a) transmitting a port dedication message from the IPC client to the IPC server;

(b) sending an information message back to the IPC client from the IPC server informing the IPC client of which ports the IPC server has available;

(c) transmitting a message from the IPC client to the IPC server selecting which port it wants to have dedicated; and (d) sending a message from the IPC server to the IPC client informing the IPC client that a requested port has been dedicated for its use thereby creating a dedicated path and wherein header information does not need to be included when transferring packets over the dedicated path;

wherein in response to step (d) the IPC client updates its port dedication table;

(e) sending a message from the IPC server terminating the dedicated port; wherein once the port is dedicated in step (d), data transmitted on the dedicated port is guaranteed a predetermined Quality of Service (QoS) regardless of a total data load of other channels on each link along the dedicated data path.

4. A method as defined in claim 3, comprising the further step of:

(f) sending a message from the IPC client requesting that the dedicated port be released.

5. A method as defined in claim 3, wherein the IPC server also updates its port dedication table after step (d).

6. A method as defined in claim 3, wherein if after a predetermined period of time a port has not been located that can be dedicated, the port dedication is aborted.

7. A method as defined in claim 3, wherein the IPC network comprises an IPC network which is part of a radio communication device.

8. A method for dedicating a port in an IPC network having an IPC server and one or more IPC clients each having a router and device layer, one of the one or more IPC clients requesting a dedication of a communication path, comprising the steps of:

a) transmitting a router channel request from a router layer to a device layer in an IPC client requesting the dedication of the communication path; and b) transmitting a peer to peer request from the router layer of the IPC client requesting the communication path dedication to the router layer of the next IPC client or the IPC server in the communication path, wherein header information does not need to be included when transferring packets over the dedicated communication path;

wherein the one or more IPC clients each includes a network routing table that shows what addresses have been assigned to each of the IPC server's ports;

wherein the IPC server or one of the one or more IPC clients upon receiving a port dedication message from one of the one or more IPC clients that is a peer IPC node informs the IPC client sending the port dedication message if it has a port available for dedication;

wherein the IPC server or one of the one or more IPC clients that is a peer IPC node informs the IPC client sending the port dedication message information about the port(s) it has available;

wherein each of the port dedication tables found in each of the one or more IPC clients includes information about the IPC client's own port(s).

9. A method as defined in claim 8, comprising the further step of:

c) sending a router channel request from the router layer to the device layer of the next IPC client or IPC server in the communication path.

10. A method as defined in claim 9, wherein if the router channel request in step (c) is not replied to in a predetermined period of time, a message is sent to the router layer of the IPC client requesting the dedication of the communication path to terminate.

11. A method as defined in claim 10, wherein the communication path is terminated by the IPC client requesting the dedication of the communication path releasing each channel that was previously reserved up to the point of the timeout in step (c).

* * * * *